United States Patent [19]

Hori

[11] Patent Number: 4,527,603

[45] Date of Patent: Jul. 9, 1985

[54] AUTOMATIC LOPPING MACHINE

[76] Inventor: Renji Hori, 4-11-10, Nanpeidai, Takatsuki-shi, Osaka-fu, Japan

[21] Appl. No.: 588,772

[22] Filed: Mar. 12, 1984

[30] Foreign Application Priority Data

Mar. 11, 1983 [JP] Japan ................. 58-41025

[51] Int. Cl.³ .............................. B27L 1/00
[52] U.S. Cl. .................... 144/2 Z; 47/1 R; 83/745; 144/343
[58] Field of Search .............. 47/1; 144/2 Z, 343; 83/745

[56] References Cited

U.S. PATENT DOCUMENTS 2,482,392  9/1949  Whitaker ..................... 47/1
2,612,724 10/1952  Llewellyn .................. 144/2 Z
2,727,335 12/1955  Susil ........................ 144/2 Z
3,315,714  4/1967  Meier ....................... 144/2 Z Primary Examiner—W. D. Bray
Attorney, Agent, or Firm—Wenderoth, Lind & Ponack

[57] ABSTRACT

An automatic lopping machine comprises a main body including a drive unit, a chain saw and a plurality of drive wheels each rotatable in a plane inclined relative to the trunk of a standing tree, and an auxiliary unit including a plurality of idle wheels and adapted to be connected together with the main body so as to encircle the tree trunk. The drive unit is used to drive the chain saw and also the drive wheels when and so long as the machine revolves helically around the tree trunk so as to ascend the tree trunk.

2 Claims, 34 Drawing Figures

AUTOMATIC LOPPING MACHINE

This invention relates to an automatic lopping machine for removing or lopping branches from the trunks of standing, living trees to a certain height from the ground.

There has been proposed an automatic lopping machine comprising a main body including a plurality of drive wheels, each adapted to be driven in a plane inclined to the trunk of a standing, living tree, and an endless chain saw adapted to be driven generally in a vertical direction, and an auxiliary unit including a plurality of idle wheels and adapted to be connected to the main body so as to encircle the tree trunk with the main body and the auxiliary unit positioned on respective sides of the tree trunk. When in use, the machine ascends the tree while revolving around the tree trunk depicting a helical path, and at this time, the chain saw cuts branches from the trunk at a leading run thereof with respect to the direction of travel of the chain saw.

The known lopping machine requires the use of separate drive units, one for driving the drive wheels and the other for driving the chain saw, and the consequent use of separate reduction units and separate power transmission trains. Therefore, the known lopping machine is bulky, heavy and complicated, and is difficult to operate and handle. In addition, the known lopping machine is susceptible to frequent malfunctioning.

In addition to these disadvantages in that, since component parts of the drive system for each of the drive units and also for the chain saw are exposed to the outside without being shielded, not only does the trunk of a tree tend to be damaged and/or unnecessarily scraped, but also branches tend to be dragged in between some component parts of the drive system to such an extent as it may result in breakage of the chain saw and/or jamming of the drive system.

Accordingly, this invention has been developed with a view to substantially eliminating the above described disadvantages and inconveniences inherent in the known lopping machine and has for its essential object to provide an improved lopping machine of a type compact in structure, lightweight and easy to operate and handle.

In order to accomplish this and other objects of this invention, this invention pertains to an improved lopping machine effectively utilizable for pruning purpose. The machine according to this invention comprises a main body including a plurality of drive wheels, each adapted to be driven in a plane inclined relative to the trunk of a standing, living tree, and a vertically drive chain saw, and an auxiliary unit including a plurality of idle wheels and adapted to be coupled to the main body by means of spring-connected fastening elements. The lopping so far described operates in a manner similar to the known machine, i.e., ascends the tree while revolving helically around the tree trunk with the drive and idle wheels contracting the periphery of the tree, and with the leading run of the chain saw cutting branches off from the tree trunk. In accordance with this invention, the lopping machine of the type referred to above is provided with a single, common drive unit, for example, a gasoline or diesel engine, having its drive shaft operatively coupled to the chain saw for driving the latter at a high speed and also to the drive wheels through a reduction gear unit for driving the drive wheels at a reduced speed.

Since this invention is featured in the use of the single drive unit for both the chain saw and the drive wheels, the drive system as a whole can be simplified, making it possible to manufacture a compact, lightweight inexpensive lopping machine. In addition, since a power transmission system including endless belts or chains for driving the drive wheels is disposed downwardly of the drive wheels with respect to the direction in which the machine ascends the tree, the possibility of branches being dragged or jammed into the drive system can advantageously be minimized, thereby rendering the machine as a whole easy to handle and reliable in operation.

Moreover, since the lopping machine according to this invention is lightweight and compact as hereinbefore described, one can carry it on the bar for the transportation to the site of pruning with no difficulty, and the fitting to and removal from the tree trunk can also be performed easily and efficiently in minimized execution time.

The lopping machine embodying this invention can be used for removing branches from the tree all the way from an area corresponding to the trunk diameter of about 25 cm measured at the waist level to an area corresponding to the trunk diameter of about 8 cm. In typical applications, the time required to complete the pruning work per tree is generally 5 minutes or less, and one lopping machine of this invention has a capability comparable to the amount of labor of 2.5 persons or more and, therefore, one attendant worker can handle two lopping machines per unit time of work.

These and other objects and features of this invention will readily be understood from the following description taken in conjunction with a preferred embodiment with reference to the accompanying drawings, in which.

Before the description of this invention proceeds, it should be noted that like parts are designated by like reference numerals throughout the accompanying drawings.

Figure 1:
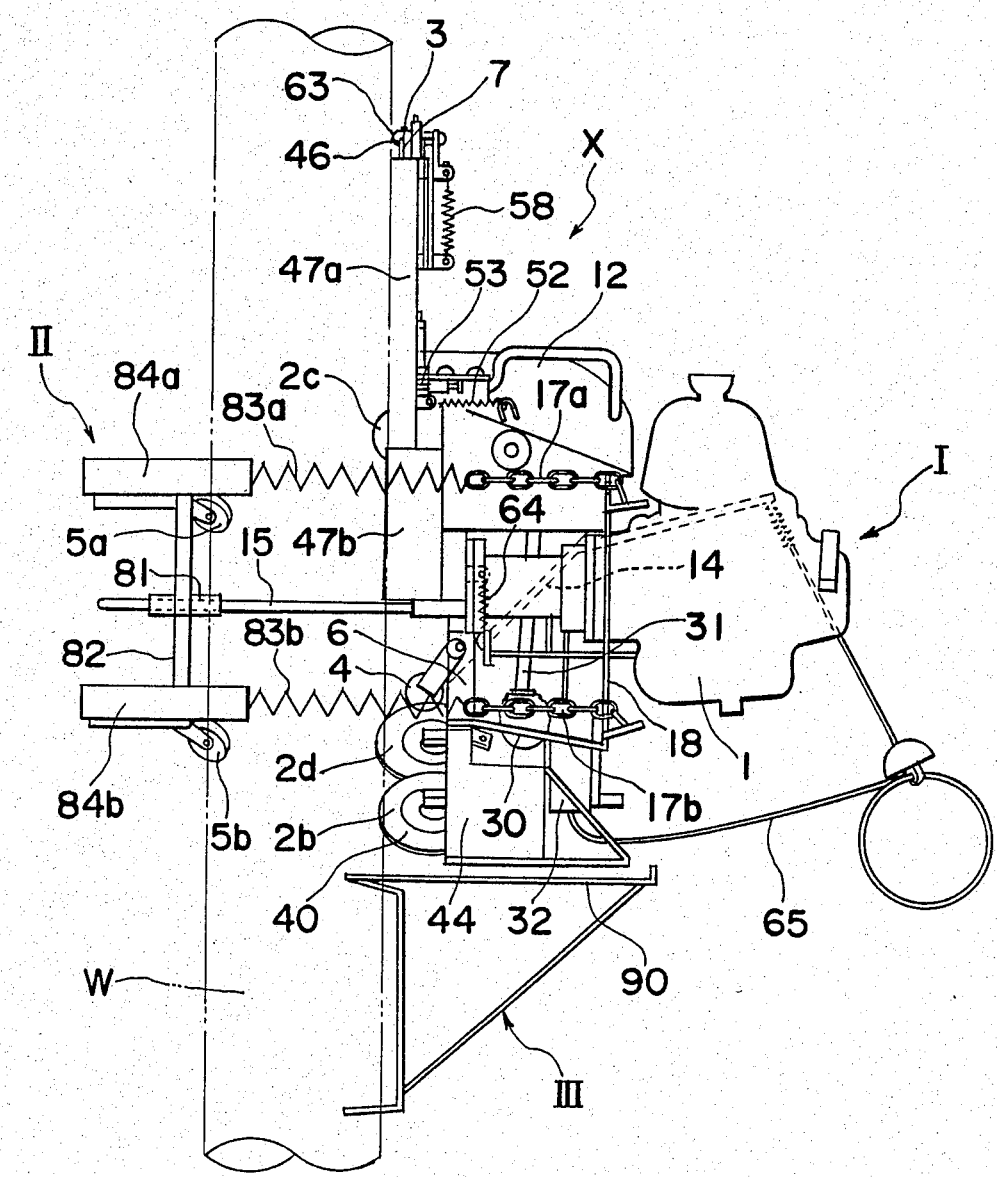
FIG. 1 is a schematic side view of a lopping machine according to a preferred embodiment of this invention, the machine being shown as set in position to the trunk of a tree.
Figure 2:
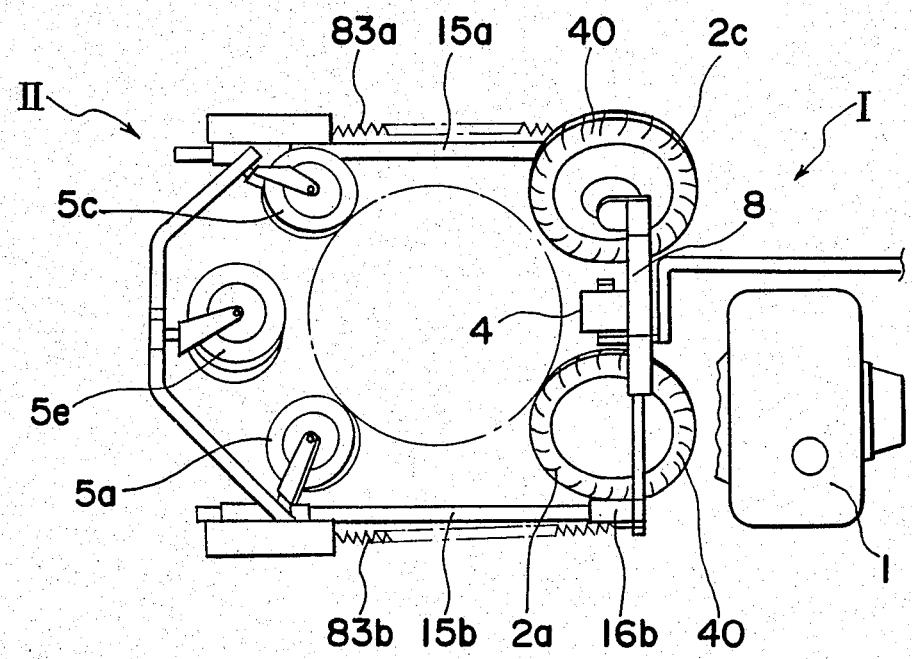
FIG. 2 is a schematic top plan view of a portion of the machine of FIG. 1.
Figure 3:
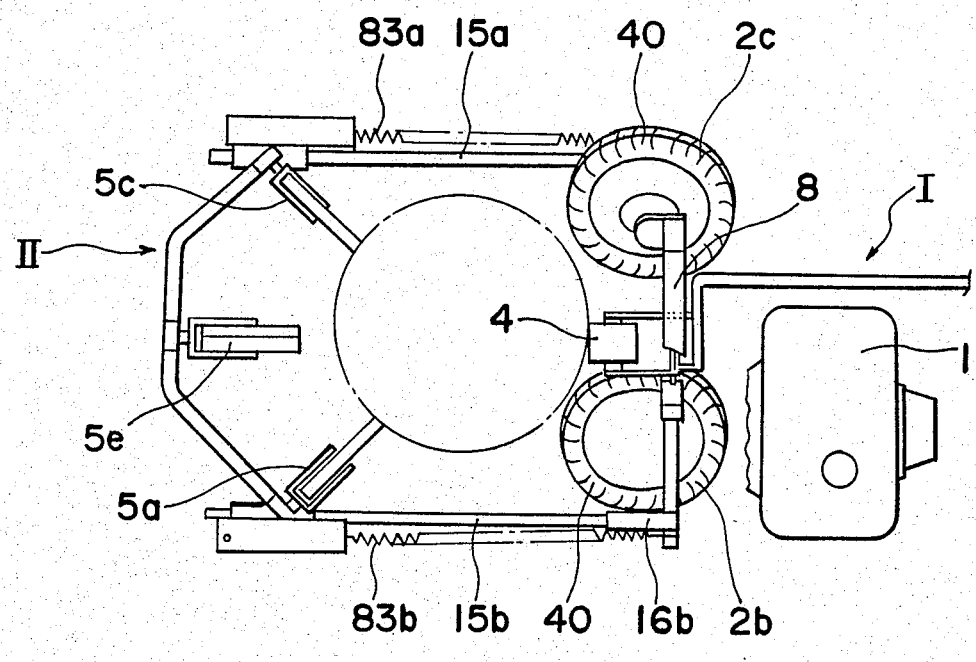
FIG. 3 is a view similar to FIG. 2, showing the condition the machine assumes during its descending motion down the tree.
Figure 4:
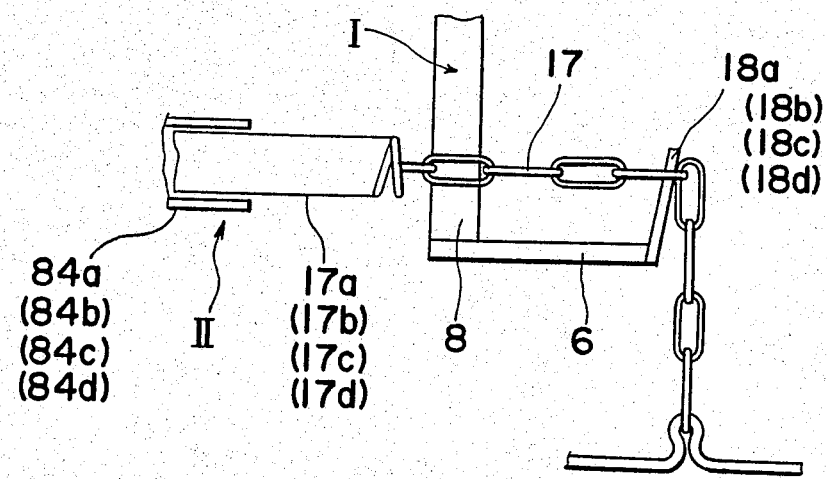
FIG. 4 is a side view, on an enlarged scale, of a portion of the machine.

Referring first to FIG. 1, a lopping machine according to this invention, generally identified by X, comprises a main body I including an engine 1, a plurality of, for example, four, drive wheels 2a, 2b, 2c and 2d, an endless chain saw 3, and a retractable idle roller 4, and an auxiliary unit II removable connectable to the main body I and including a plurality of, for example, six, idle wheels 5a, 5b, 5c, 5d, 5e and 5f.

The main body I comprises a framework 6 having the engine 1 rigidly mounted on the back thereof and also having upper and lower pairs of the drive wheels 2a, 2c and 2b, 2d arranged on the front thereof so as to partly protrude outwards for driving engagement with the peripheral surface of a tree trunk W in a manner as will become apparent from the subsequent description. The framework 6 also has a guide plate 7 mounted on the top thereof for guiding the chain saw 3, and carries the retractable idle roller 6 supported at the front thereof for movement between projected and retracted position.

Figure 5:
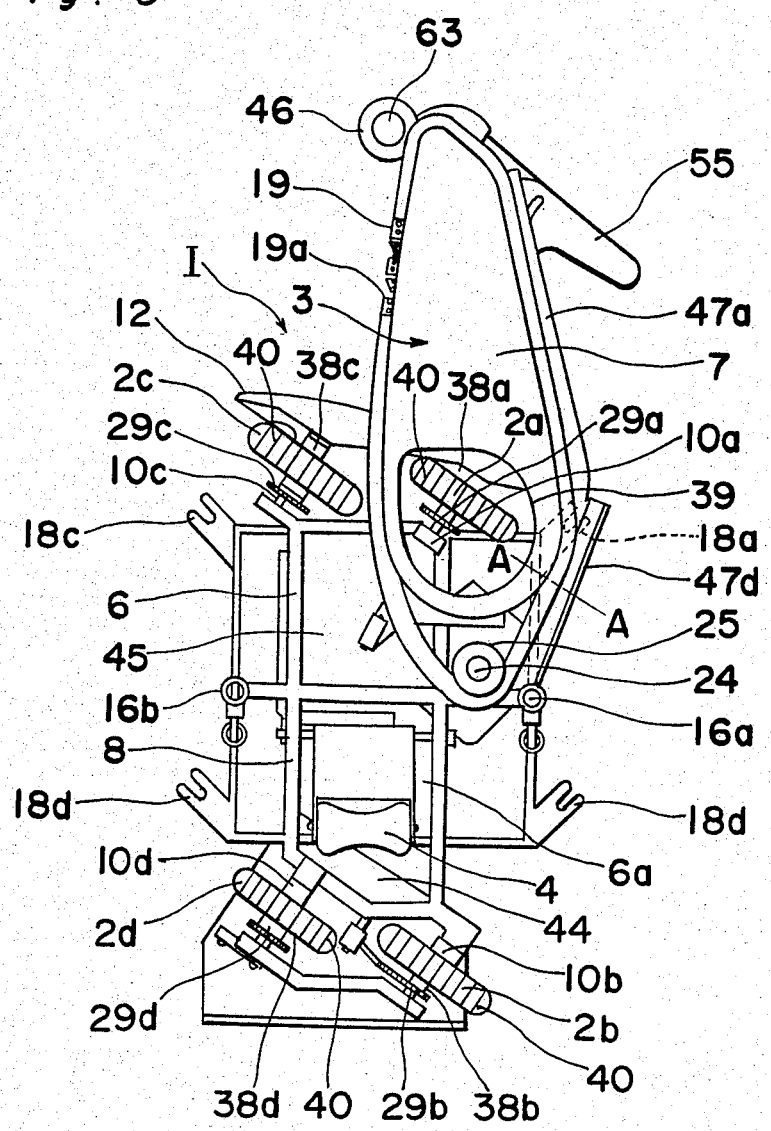
FIG. 5 is a front elevational view of a main body of the machine.
Figure 8:
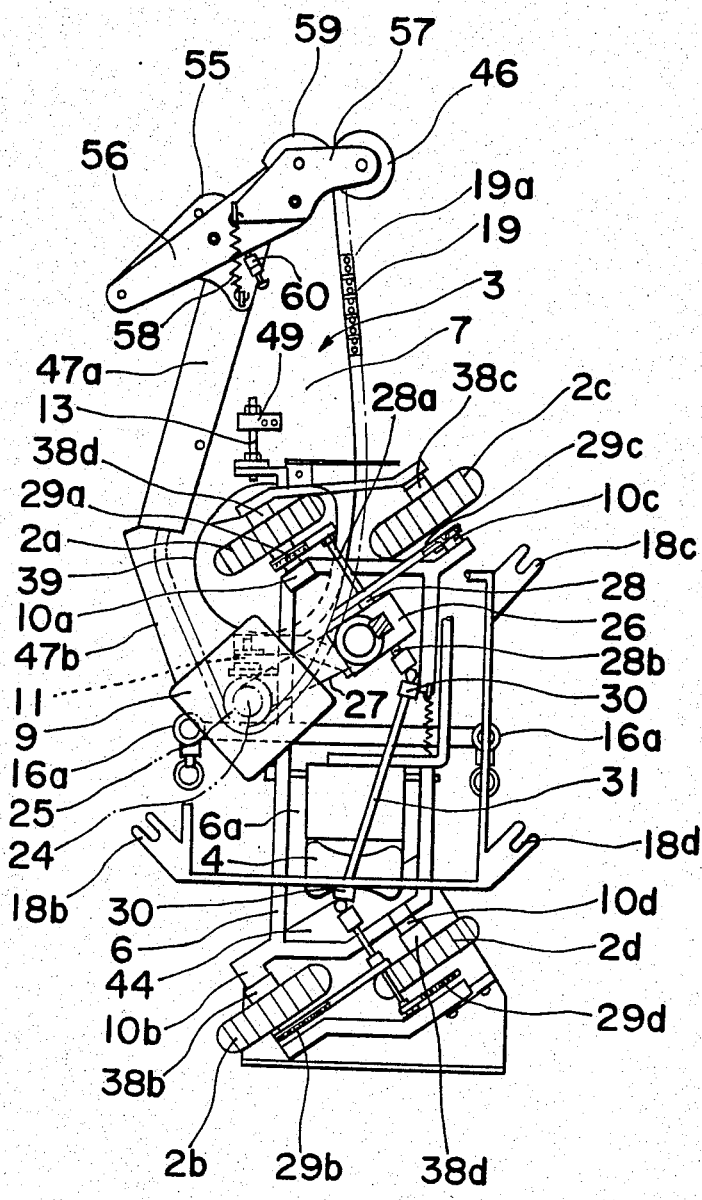
FIG. 8 is a rear elevational view of the machine main body with a portion removed.
Figure 9:
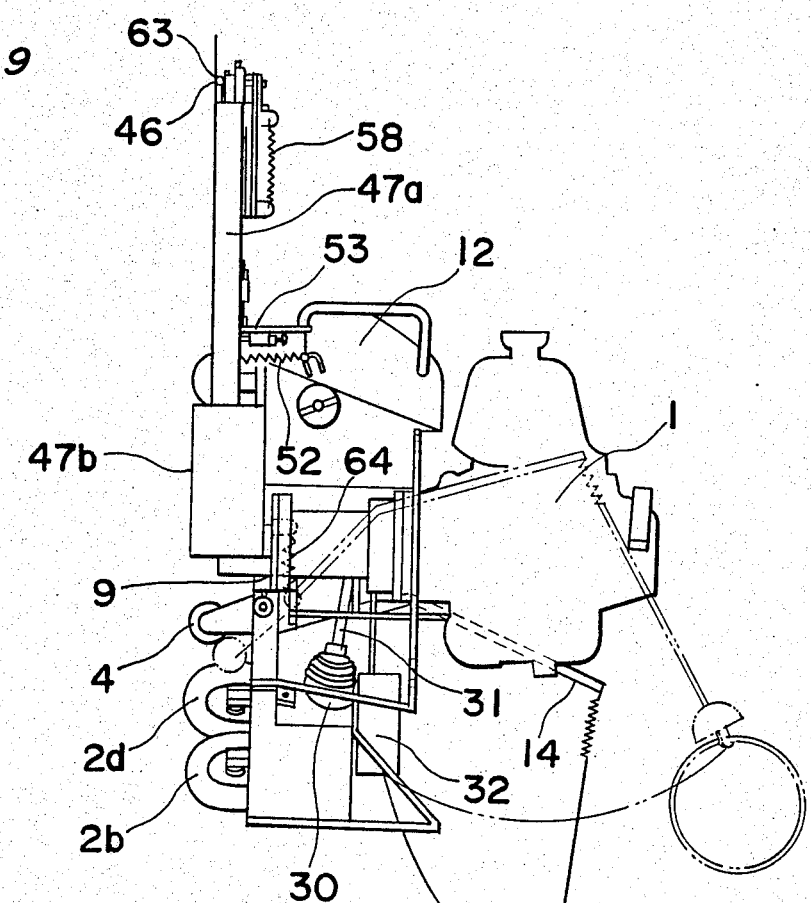
FIG. 9 is a view similar to FIG. 6, showing the main body descending the tree.
Figure 11:
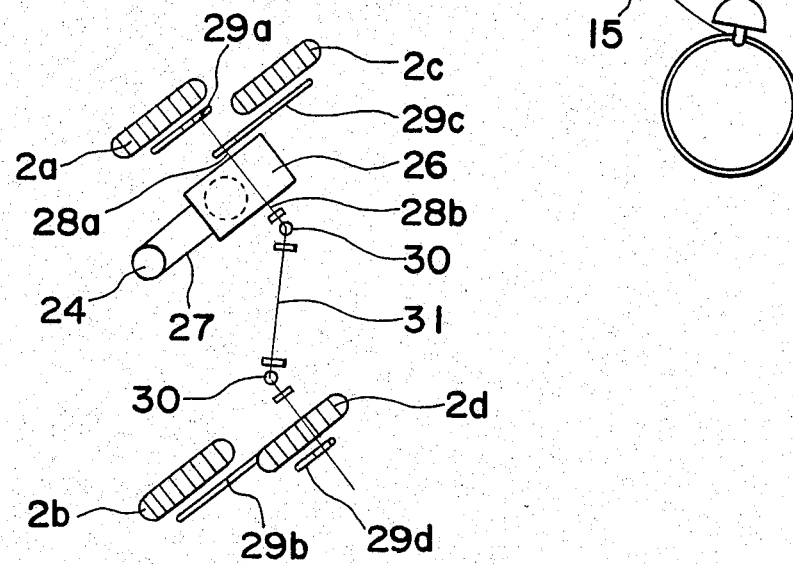
FIG. 11 is an explanatory diagram used to explain the drive system shown in FIG. 10.

As best shown in FIG. 5, the framework 6 is fabricated from lengths of steel piping 8 so bent and so connected so as to give a shape substantially similar to a lattice or junglegym. The framework 6 has a carrier plate 9 rigidly secured to a rear central portion thereof as shown in FIG. 8, the engine 1 being mounted on the framework 6 through the carrier plate 9. The framework 6 also has upper and lower pairs of bearing studs 10a, 10c and 10b, 10d rigidly secured to and extending outwardly from four corner portions of the framework for the support of the associated pairs of the drive wheels 2a, 2c and 2b, 2d. The guide plate 7 for the chain saw 3 mounted on the front top of the framework 6 is secured at two points to a lower bearing boss 11, provided on the carrier plate 9, and an upper bearing boss 13 mounted on the upper right-hand bearing stud through an upper covering 12. The retractable idle roller 4 is disposed in a window defined at 6a in the framework central portion thereof and is rotatably carried by a support lever 14 of a generally L-shaped configuration. A pair of bearing sleeves 16a and 16b are rigidly secured to the framework 6 for receiving therein and guiding associated side rods 15a and 15b extending from the auxiliary unit II in parallel and laterally spaced relation to each other. Rigidly secured to and extending outwardly from the front four corners of the framework 6 is hook members 18a, 18b, 18c and 18d over which respective lengths of chains 17a, 17b, 17c and 17d connected to the auxiliary unit II through tension springs 83a, 83b, 83c and 83d are engaged when the machine of this invention is set around the tree trunk W.

Figure 6:
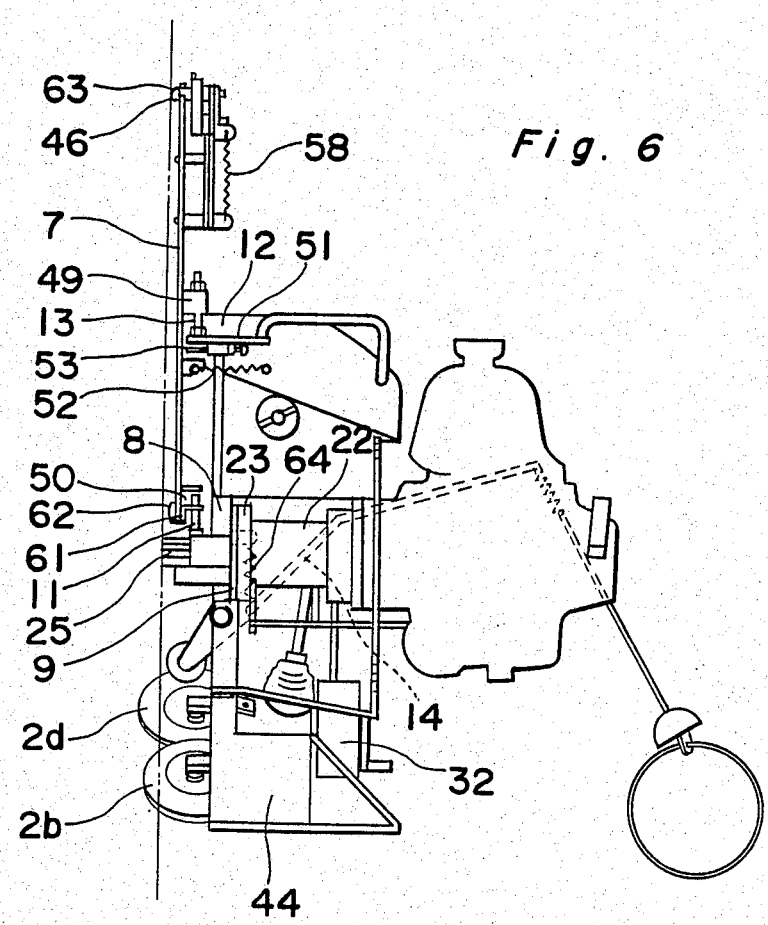
FIG. 6 is a side elevational view of the machine main body.
Figure 10:
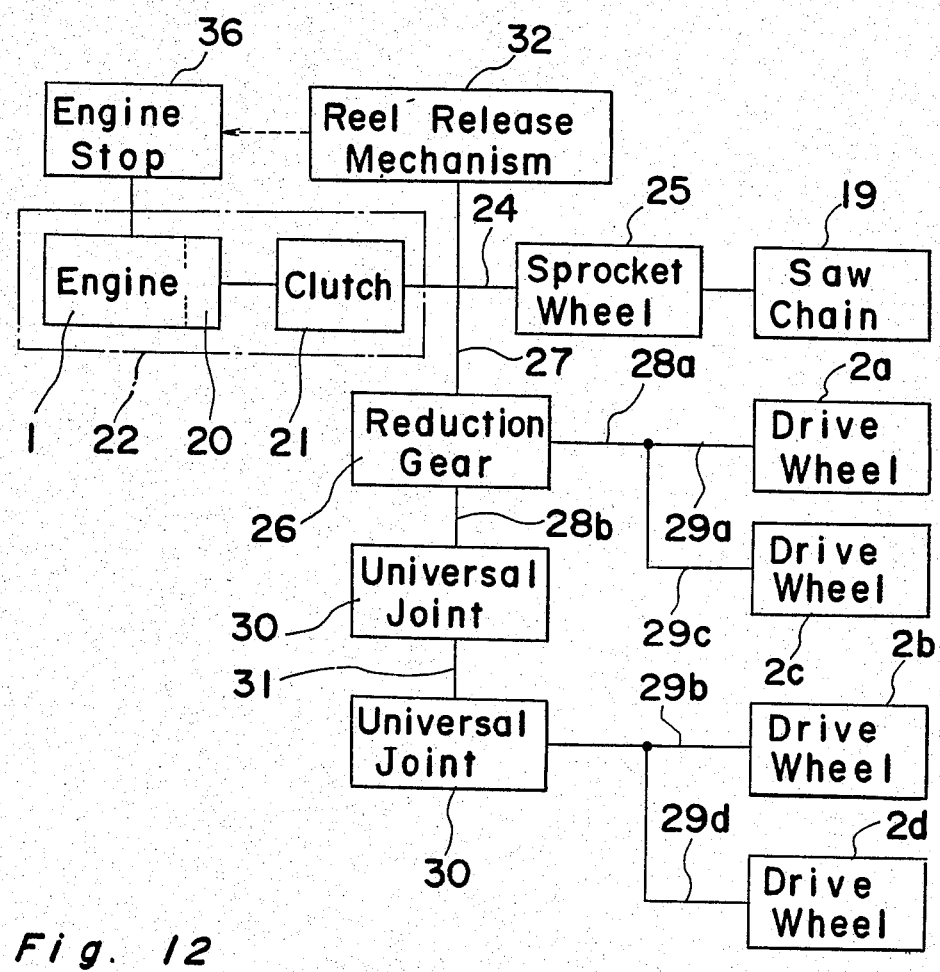
FIG. 10 is a block diagram showing a drive system employed in the machine of this invention.

The engine 1 is used to drive the drive wheels 5a to 5d and, also, a saw chain 19 constituting the chain saw 3 and may be either a gasoline engine or a diesel engine. A housing 22 for the engine 1, in which a speed regulating governor 20 and a centrifugal clutch 21 are incorporated, as shown in FIG. 10, has a flange 23 through which the housing 22 with the engine 1 therein is rigidly secured to the carrier plate 9 as best shown in FIG. 6. A drive shaft 24 extending outwardly from the centrifugla clutch 21 in turn extends frontwardly from the framework 6 with its free end having a sprocket wheel 25 mounted thereon for rotation together therewith, said sprocket wheel 25 being used to drive the saw chain 19, which is trained between the sprocket wheel 25 and the guide plate 7. For driving the drive wheels 2a to 2d, the drive shaft 24 is also drivingly coupled thereto through a reduction gear unit 26 as shown in FIG. 10. The reduction gear unit 26 is rigidly mounted on the rear top of the framework 6 as shown in FIG. 8 and is drivingly connected with the drive shaft 24 through an endless drive chain 27. This reduction gear unit 26 has a drive output shaft 28 extending thereacross, an upper end 28a of which is drivingly coupled to the upper pair of the drive wheels 2a and 2c through respective endless chains 29a and 29c, while the opposite, lower end 28b of said drive output shaft 28 is drivingly coupled to the lower pair of the drive wheels 2b and 2d through respective endless chains 29b and 29d by means of an intermediate transmission system including two universal joints 30 on the opposite ends of a connecting rod 31. The governor 20 for the engine 1 is so designed and so operable as to regulate the speed of rotation of the drive shaft 24 to a lower value to permit the engine 1 to withstand a high load.

Figure 12:
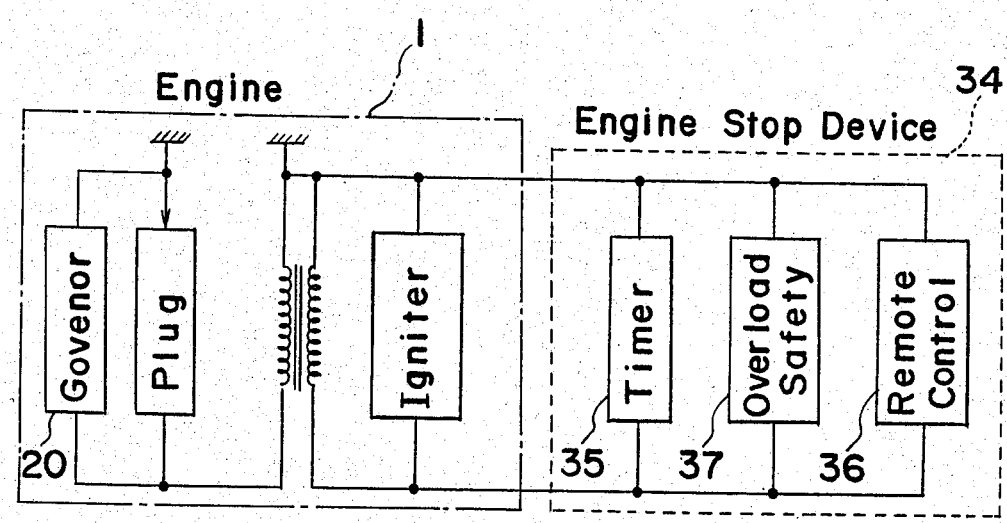
FIG. 12 is a block diagram showing an engine control system used in the machine of this invention.
Figure 13:
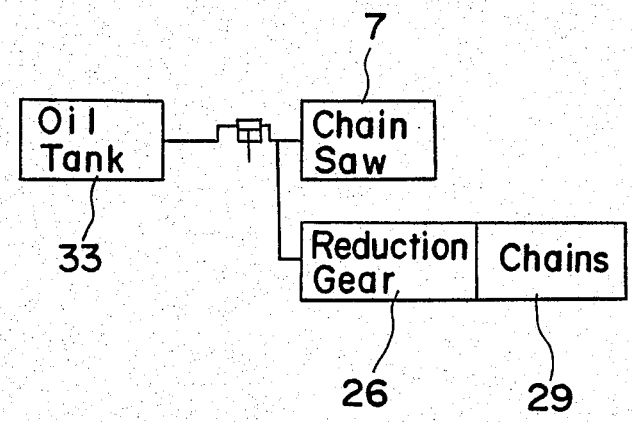
FIG. 13 is a block diagram showing a fluid circuit for oiling.
Figure 14:
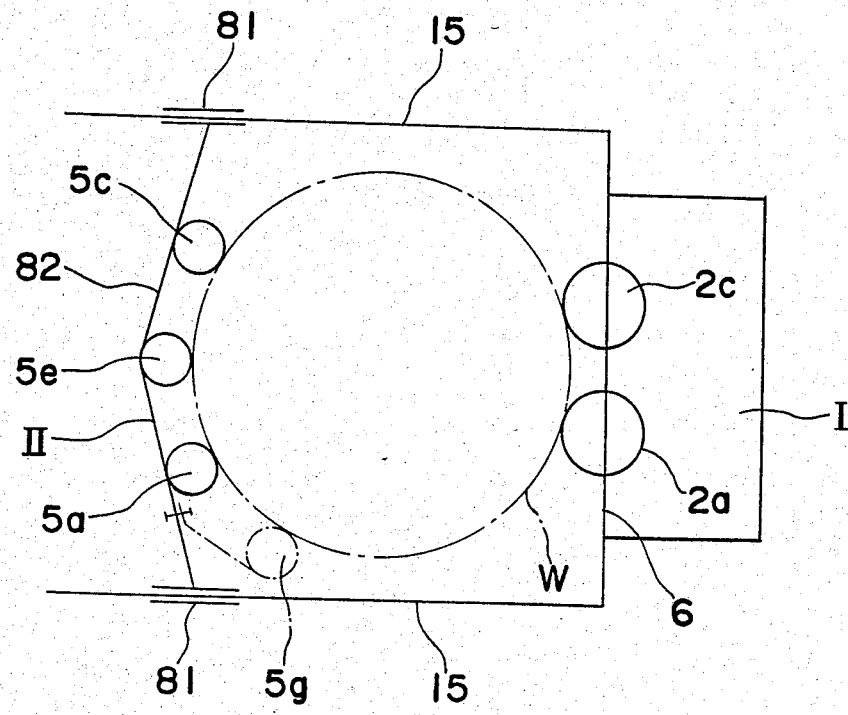
FIG. 14 is a diagramatic representation of FIG. 2.

The centrifugal clutch 21 for the engine 1 serves to couple and decouple the drive shaft 24 to and from the engine 1 and also to operate a reel release mechanism in a manner which will be described later when it is in decoupling position, i.e., in position to decouple the drive shaft 24 from the engine 1. The drive unit including the engine 1 also includes, as shown in FIG. 13, an automatic oiling device 33 for oiling pistons, bearings, a chain saw bar, the reduction gear unit 26, the chains 29a to 29d and other movable parts, and is provided with an electric control circuit 34, as shown in FIG. 12, for controlling the start and interruption of the engine 1, which electric control circuit 34 includes a timer 35, a remote control switch 36 and an overload safety device 37 for bringing the engine 1 to a halt in the event of the occurrence of overload.

The drive wheels 2a to 2d are rotatably mounted on the bearing studs 10a to 10d by means of axles 38a, 38b, 38c and 38d, respectively, for rotation in a plane inclined at a predetermined angle, for example, 20°, relative to the vertical. In other words, when viewed form the front of the framework 6 as shown in FIG. 5, all of the drive wheels 2a to 2d are so supported and so positioned on the bearing studs 10a to 10d by means of the axles 38a to 38d, respectively, that the plane of rotation of each of the drive wheels 2a to 2d can lie in a plane inclined downwardly from the left-hand top portion of the drawing of FIG. 5 at a predetermined angle, for example, 20°, relative to the horizontal plane, i.e., the plane generally parallel to the ground surface. The axles 28a to 28d of the respective drive wheels 2a to 2d mounted on the associated bearing studs 10a to 10d fast with the framework 6 are, when viewed from the top of the framework 6 as shown in FIGS. 2 to 14, located in the same plane at the front of the framework 6 such that the drive wheels 2a to 2d partly protrude an equal distance outwardly from the front of the framework 6 for engagement with the peripheral surface of the tree trunk W. The greater the distance between the upper and lower pairs of the drive wheels 2a, 2c, and 2b, 2d is, the more the travel of the machine X along the tree trunk W is stabilized. However, the smaller the distance between the drive wheels 2a and 2b and the drive wheel 2c and 2d is, the smaller the radius of gyration of the machine.

When the machine X is set in position around the tree trunk W, the drive wheels 2b, 2c and 2d directly contact the peripheral surface of the tree trunk W, but the drive wheel 2a contacts it through an opening 39 defined in a lower central portion of the guide plate 7 for the chain saw as seen from FIG. 5.

Figure 15:
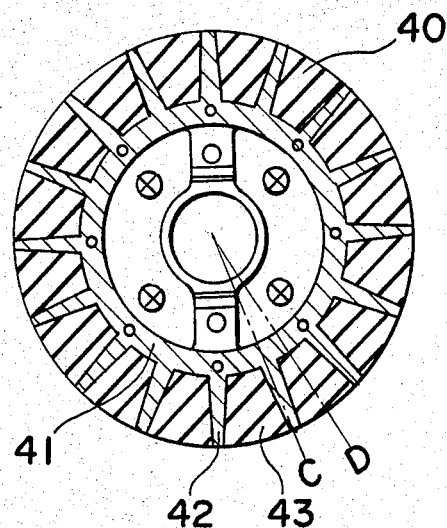
FIG. 15 is a sectional view of one of the drive wheels used in the machine of this invention.
Figure 16:
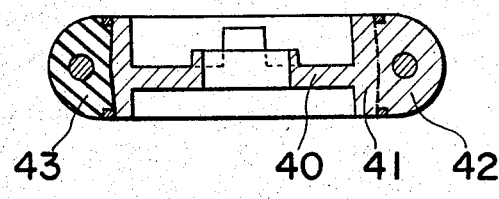
FIG. 16 is a cross-sectional view taken along the line C-D in FIG. 15.

The opposite ends of each of the axles 38a to 38d of the associated drive wheels 2a to 2d is journalled by the respective bearing stud 10a, 10b, 10c or 10d, and the chains 29a to 29d for driving the respective drive wheels 2a to 2d are disposed beneath the drive wheels 2a to 2d as if the drive wheels 2a to 2b serve for the associated claims 29a to 29d a protective shield necessary to avoid entanglement or jamming of branches into the path of travel of the chains 29a to 29d from above. As best shown in FIG. 15, each of the drive wheels 2a to 2d is in the form of a tire wheel 40 comprising a metal ring 41 having a plurality of circumferentially equally spaced metal fins 42 integral therewith and extending an equal distance radially outwardly therefrom, the space between the adjacent two of these metal fins 42 being filled up with rubber material 43 to make up the wheel having a continuous, smooth and arcuately sectioned outer periphery as shown in FIG. 16. In this construction, each of the drive wheels 2a to 2d has a highly improved durability and, also, can exert a high frictional force when contacting the peripheral surface of the tree trunk without substantially giving damage to the bark. Specifically, the greater the outer diameter of each drive wheel, the higher the force of friction. However, the smaller the outer diameter thereof, the smaller the radius of gyration of the machine X.

Portions of the drive wheel 2b and 2d opposite to the portions thereof which protrude outwards from the front of the framework 6, and the associated chains 29b and 29d trained around the respective axles 38b and 38d are both protected by a lower covering 44 secured to a rear lower portion of the framework 6 and extending generally downwards therefrom. An upper covering 12 secured to a rear upper portion of the framework 6 overhangs portions of the drive wheels 2a and 2c opposite to the portions thereof which protrude outwards from the front of the framework 6, the associated chains 29a and 29c trained around the respective axles 38a and 38c, the reduction gear unit 26 and the engine 1. The reduction gear unit 26 is also covered at its front portion by a front covering 45 secured to a front upper portion of the framework 6.

In addition to the saw chain 19 trained between the guide plate 7 and the sprocket wheel 25, and a support means including the upper and lower bearing bosses 11 and 13 for connecting the guide plate 7 to the framework 6, the chain saw 3 includes a guiding means including a guide roller 46 for trapping and guiding tree branches towards the saw chain 19, a spacer means arranged at upper and lower portions of the guide plate 7 for keeping a distance between the periphery of the tree trunk and the saw chain 19, and a pair of elongated side covers 47a and 47b covering the trailing run of the saw chain 19 with respect to the direction of travel of the saw chain 19. The guide plate 7 is in the form of a high strength metal plate and is so mounted and so positioned on the framework 6 so as to project upwardly from the framework 6 while lying in a plane spaced a slight distance frontwardly from the framework 6 and generally in parallel relation to the front of the framework 6. With the guide plate 7 so mounted in the manner described above, the leading run 19a of the saw chain 19 extends upwardly between the upper pair of the drive wheels 2a and 2c and faces in a direction towards the direction of revolution of the machine X around the tree trunk during the ascending motion thereof.

Figure 7:
FIG. 7 is a cross-sectional view taken along the line A—A in FIG. 5.

The guide plate 7 has a generally egg-shaped configuration and has the opening 39 defined at a lower central portion thereof, through which opening 39 the drive wheel 2a projects partly outwards for the purpose which has been described hereinbefore. As best shown in FIG. 7, the peripheral edge of the guide plate 7, except for a lower end portion thereof confronting the sprocket wheel 25, is so shaped into a generally V-shaped section so as to define a guide groove 48 along which the saw chain 19 travels. This guide plate 7 is pivotable about a common axis passing through the bearing bosses 11 and 13 and, for this purpose, has a pair of spaced bearing bushings 49 and 50 for receiving therein the bearing bosses 13 and 11, respectively. The bearing bosses 11 and 13 are carried on above the other by the framework 6 with their longitudinal axis aligned with each other, the lower bearing boss 11 being rigidly mounted on the carrier plate 9 while the upper bearing boss 13 is rigidly mounted on a fixture 51 which is in turn adjustably mounted on the upper cover 12. Accordingly, the guide plate 7 is pivotable about the axis common to the upper and lower bearing bosses 13 and 14, but is normally biased by a tension spring 52 in one direction about the previously mentioned common axis with the trailing run of the saw chain 19 close towards the upper cover 12. The guide plate 7 so biased is held in one position defined by a stopper 53 to which a left-hand side portion of the guide plate 7 as viewed in FIG. 5 abuts.

The saw chain 19 trained between the guide plate 7 and the sprocket wheel 25 on the drive shaft 24 is adapted to be driven in one direction with its leading and trailing runs 19a and 19b situated on right-hand and left-hand sides of the guide plate 7, respectively, as viewed in FIG. 8, the leading run 19a of the saw chain 19 being utilized for lopping branches off the tree trunk W. Preferably, the top of the guide plate 7 corresponding in position to the boundary between the leading and trailing runs 19a and 19b is so shaped so as to point towards the guide roller 46 for the purpose of facilitating the entry of each tree branch to be cut in between the roller 46 and the leading run 19a of the saw chain 19. In addition, the opposite ends of the guide groove 48 defined in the portion of the peripheral edge of the guide plate 7 are preferably enlarged outwardly to facilitate the entry and exit of the saw chain 19 being driven in one direction.

The guide means referred to above comprises a support arm 55 rigidly mounted on the top of the guide plate 7 and situated on one side of the guide plate 7 opposite to the three, a first pivotable lever 56 mounted on the support arm 55 for pivotal movement through a predetermined angle, a second pivotable lever 57 mounted on the first pivotable lever 56 for pivotal movement through a predetermined angle, a biasing spring 58, for example, a tension spring, for biasing the second pivotable lever 57 in a direction counterclockwise as viewed in FIG. 8, a generally sector-shaped roller 59 made preferably of synthethic resin and rotatably mounted on the first pivotable lever 56, and a stopper 60 for the first pivotable lever 56. The guide roller 46 also constituting a part of the guide means is preferably made of synthetic resin and is rotatably mounted on the second pivotable lever 57 at one end thereof opposite to the first pivotable lever 56. The sector-shaped roller 59 has its arcuate peripheral portion protruding upwardly outwards from the top perimeter of the guide plate 7 and serves to avoid any undesirable contact of each tree branch with a portion of the saw chain 19 turning around the top of the guide plate 7.

Figure 18:
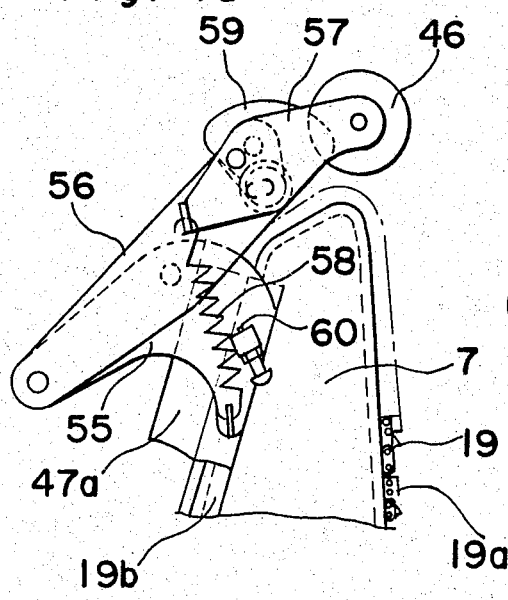
FIG. 18 is a front elevational view, on a somewhat enlarged scale, of a portion of the chain saw.
Figure 20:
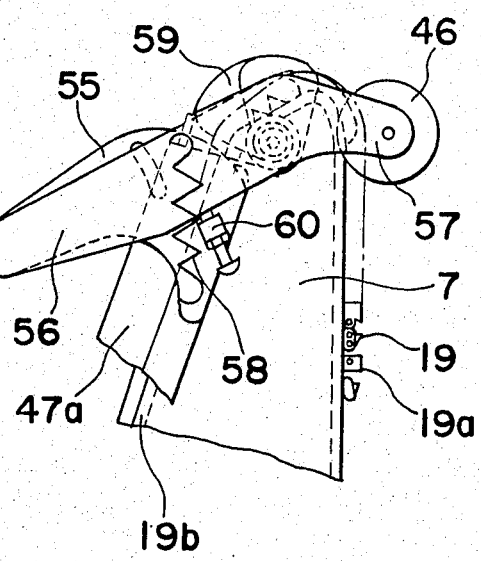
FIG. 20 is a view similar to FIG. 18, showing a guide element in a different operative position.
Figure 17:
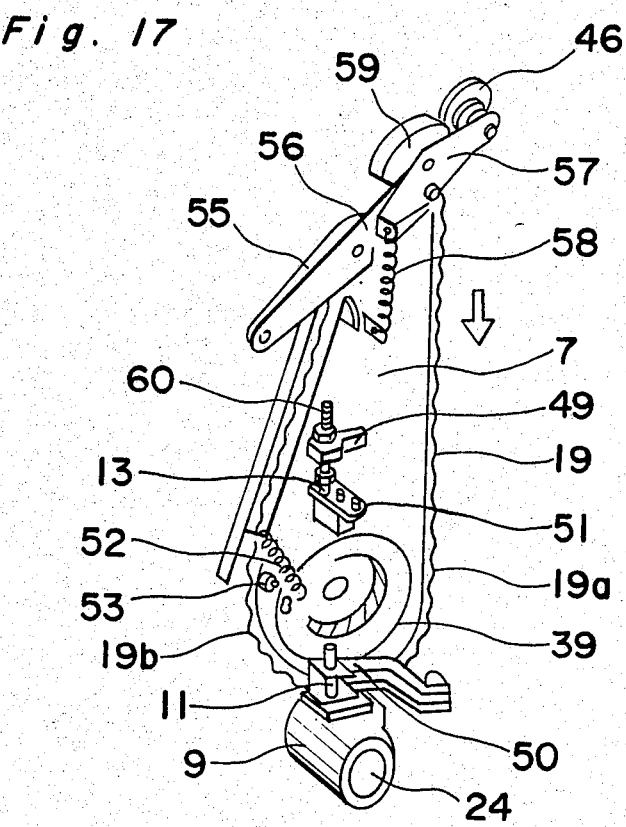
FIG. 17 is a perspective view of an endless chain saw used in the machine of this invention.

The guide roller 46 mounted on the second pivotable lever 57 as hereinbefore described has its peripheral portion protruding outwards from the path of travel of the leading run 19a of the saw chain 19 so as to to draw each tree branch inwardly between the roller 46 and the leading run 19a of the saw chain 19. More specifically, the guide means is so designed and so positioned relative to the guide plate 7 that, as the tree branch enters in between the roller 46 and the leading run 19a of the saw chain 19 when the machine X ascends the tree trunk W while spirally revolving therearound, the roller 46 can be angularly upwardly shifted against the spring 58 together with the first and second pivotable levers 56 and 57 as shown in FIG. 20 while forcing the tree branch towards the leading run 19a of the saw chain 19, but as the tree branch relatively rolls over roller 46 during the ascending motion of the machine X revolving spirally therearound, the first pivotable lever 56 can be biased by the spring 58 to make the machine X as a whole forced downwards together with the roller 46 to let the tree branch pass over the sector-shaped roller 59 without contacting the chain 19 as shown in FIG. 18. In this way, the guide means, particularly the guide roller 46, discriminates the tree branch located at a height within the reach of the chain saw 3 and that at a height outside the reach of the same, and the tree branch at a height within the reach of the chain saw 3 can be guided by the guide roller 46 towards the saw chain 19, but the tree branch at a height outside the reach of the chain saw 3 is allowed to pass over the guide roller 46 and, then, the sector-shaped roller 59 for the next succeeding turn of the machine X to cut it from the tree trunk W.

The spacer means referred to hereinbefore comprises, as best shown in FIG. 6, lower and upper leg members 62 and 63 each having a predetermined length. The lower leg member 62 is rigidly mounted on a plate piece 61 secured to a rear lower portion of the guide plate 7 and protruding a predetermined distance frontwardly from the guide plate 7. The upper leg member 63 is secured coaxially to the guide roller 46 and protruding a predetermined distance frontwardly of the guide plate 7 and in a direction towards the tree. When the machine X is in use the respective tips of the leg members 62 and 63 slidingly contact the peripheral surface of the tree trunk W, keeping the chain saw 3 spaced a minimized distance from the peripheral surface of the tree trunk W.

Figure 29:
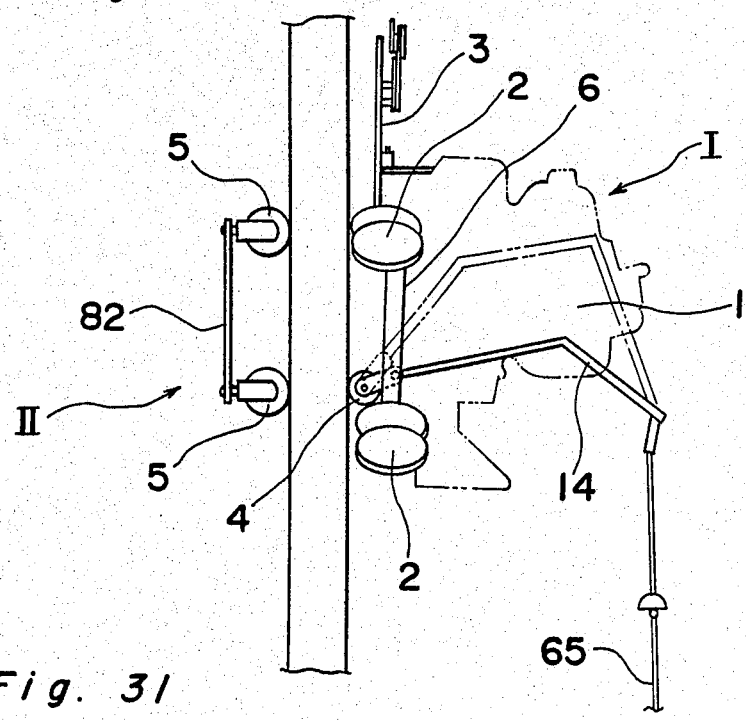
FIG. 29 is an explanatory diagram used to explain the descending motion of the machine down the tree.

The retractable idle roller 4 operable when the machine X which has ascended to a predetermined or desired height above the ground is desired to descend the tree trunk is rotatably carried by a support lever 14 which is in trunk pivotally mounted at a substantially intermediate portion thereof on the framework 6. One end of the support lever 14 opposite to the idle roller 4 loosely extends through the framework 6 and terminates outside the framework 6 for the access to an operator of the machine X as best shown in FIGS. 1, 6, 9 and 29. When the free end of the lever 14 opposite to the idle roller 4 is pulled downwards in a direction shown by the arrow in FIG. 29, the idle roller 4 which has been held in the retracted position, as shown in FIGS. 1 and 6, is brought to the projected position as shown in FIG. 29, contacting the peripheral surface of the tree trunk W while separating the drive wheels 2a to 2d from it. In this way, when the free end of the lever 14 is pulled downwards, the machine X can descend straight the tree trunk W with the idle wheels 5a to 5d and the idle roller 4 freely rolling along the tree trunk W. To keep the idle roller 4 in the retracted position, a biasing spring 64 is employed and disposed between a portion of the framework 6 and a portion of the lever 14 on one side remote from the roller 4 so as to bias the lever 14 in a direction counterclockwise as viewed in FIGS. 1, 6 and 9. For the purpose which will be described later, a pull cable 65 is connected to the free end of the lever 14. In practice, unless the machine X having ascended is desired to be recovered down the tree trunk W, the pull cable 65 is wound around a reel 32, and the reel 32 is in turn releaseably connected to the framework 6 through a reel release mechanism in a manner which will now be described.

Figure 22:
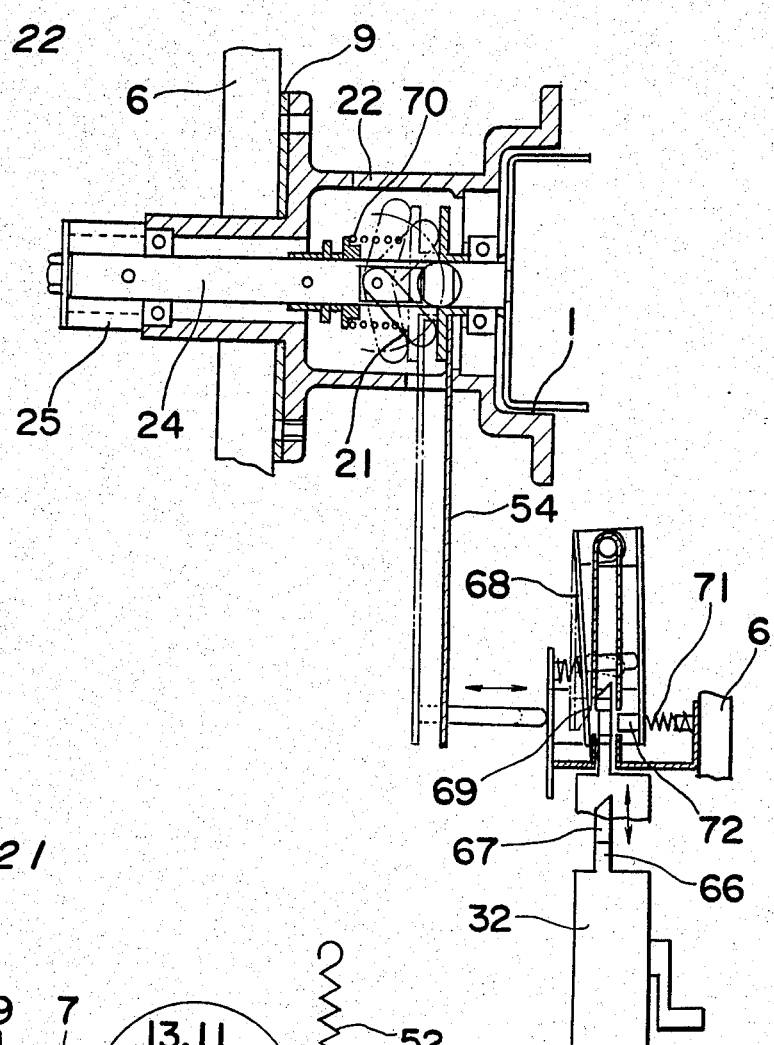
FIG. 22 is a sectional view of a reel release mechanism used in the machine of this invention.
Figure 21:
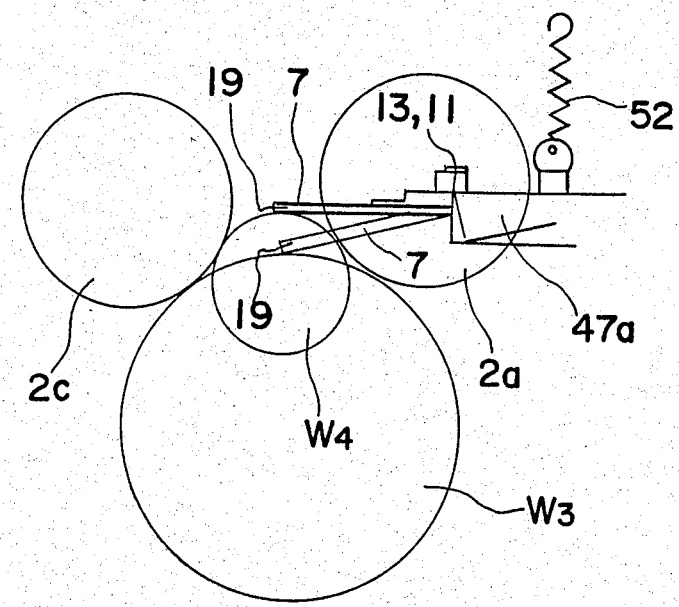
FIG. 21 is a view similar to FIG. 21, showing the manner in which the chain saw is laterally displaced.
Figure 23:
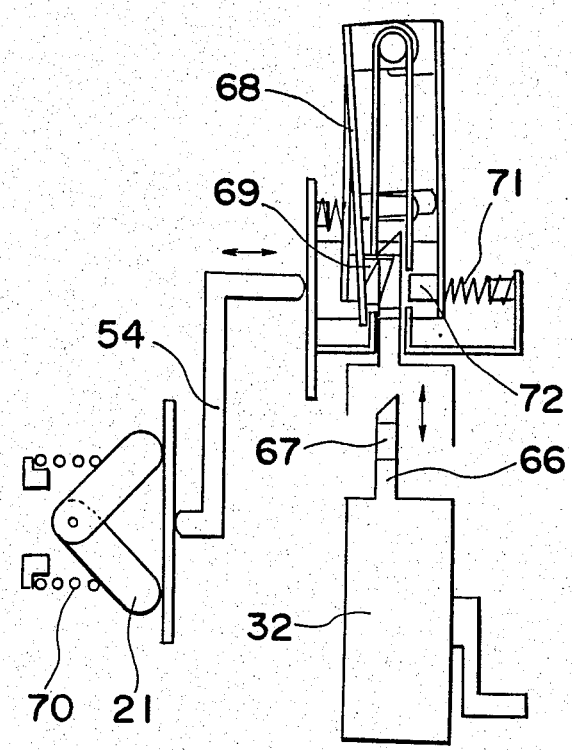
FIGS. 23 and 24 are views similar to FIG. 22, showing the reel release mechanism in different operative positions, respectively.
Figure 24:
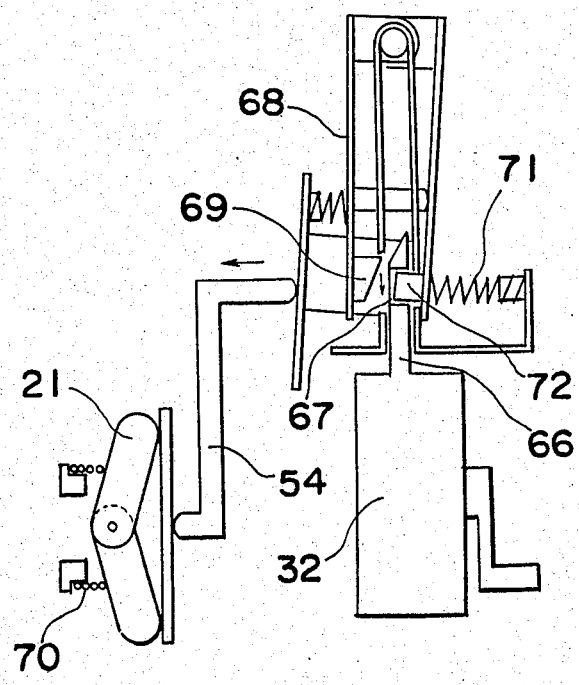

As best shown in FIG. 22, the reel release mechanism is operatively associated with the centrifugal clutch 21 and comprises an operating plate 68 having a first carrier pin 69 rigidly secured thereto and engageable in a hole 67 defined in an arm 66 integral with and extending outwardly from the reel 32. The operating plate 68 is so operatively coupled to the clutch 21 through a connecting lever 54. The reel release mechanism is so designed that, so long as the engine 1 has not yet been operated, the first carrier pin 69 can be engaged in the hole 67 in the reel 32 by the action of a spring 70 incorporated in the clutch 21, thereby holding the reel 32 in an elevated position, as shown in FIG. 23, but when the clutch 21 is operated as a result of the rotation of the engine 1, a second carrier pin 72 rigidly secured to the operating plate 68 can be moved into the hole 67 in the reel 32 by the action of a compression spring 71 while pushing the first carrier pin 70 out of the hole 67, thereby allowing the reel 32 to be carried in a lowered position by the second carrier pin 72 as shown in FIG. 24. Starting from this condition, i.e., while the reel 32 is carried by the second carrier pin 72 then projecting into the hole 67, the subsequent stop of the engine and, hence, the interruption of operation of the clutch 21, results in that the connecting lever 54 is displaced rightwards, as viewed in FIG. 23, by the action of the spring 70 in the clutch 21, causing the operating plate 68 to pivot counterclockwise, as viewed in FIGS. 23 and 24, against the compression spring 71 with the second carrier pin 72 consequently disengaged from the hole 67 in the reel 32. When this occurs, the reel 32 is released from the machine X and falls by its own gravity onto the ground or down to an appropriate height above the ground, delivering the pull cable 65 to a position conveniently accessible to the machine operator. As hereinbefore described, when the machine operator pulls the pull cable 65 downwards, the machine X, having ascended the tree trunk W, can be drawn down the tree trunk while the idle wheels 5a to 5f and the idle roller 4 roll along the tree trunk W.

As hereinbefore described, in order for the machine X to be set to the tree trunk W, the main body I and the auxiliary unit II must be connected together. This connection can be accomplished by inserting the side rods 15a and 15b through the respective bearing sleeves 16a and 16b and then through bearing sleeves 81 in the auxiliary unit II and engaging the connecting chains 17a to 17d over the respective hook members 18a to 18d fast with the framework 6 while the tension springs 83a to 83d are pulled axially outwards. Depending on the extent to which the springs 83a to 83d are pulled axially outwardly, the force necessary for the main body I and the auxiliary unit II to clamp the tree trunk W from the opposite directions towards each other can be adjustable. When and so long as the machine X is set in position around the tree trunk W, the drive wheels 2a to 2d and at least the idle wheels 5a to 5d contact the tree trunk W under pressure. The idle wheels 5e and 5f may not always contact the tree trunk, depending on the diameter of the trunk, but may be brought into contact therewith as the machine X ascends the tree trunk W to a height where the diameter of the tree trunk is small.

Hereinafter, the details of the auxiliary unit II will be described with particular reference to FIGS. 1, 2, 3 and 25 to 28.

Figure 25:
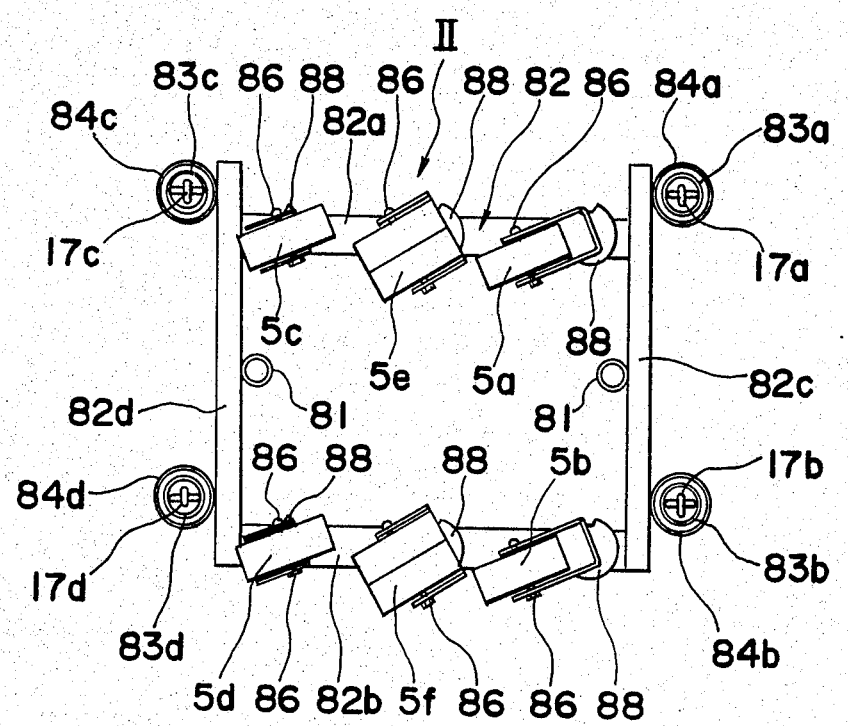
FIG. 25 is a front elevational view of an auxiliary unit of the machine of this invention.
Figure 26:
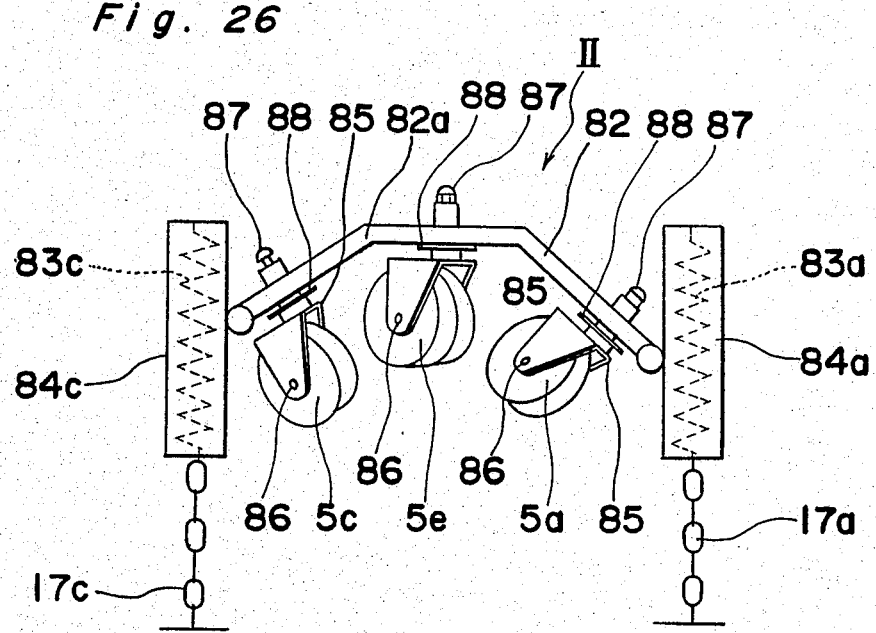
FIG. 26 is a top plan view of the machine auxiliary unit shown in FIG. 25.

The auxiliary unit II comprises an auxiliary framework 82 carrying the upper and lower rows, the idle wheels 5a, 5c, 5e and 5b, 5d, 5f, the bearing sleeves 81 for receiving therein the side rods 15, and cylindrical spring casings 84a, 84b, 84c and 84d. The spring casings 84a to 84d accommodate therein the corresponding tension springs 83a to 83d, each having one end rigidly secured to a closed end of the respective spring casing 84a, 84b, 84c or 84d and the other end connected with the respective connecting chain 17a, 17b, 17c or 17d situated outside the spring casing. The auxiliary framework 82 is fabricated from lengths of high strength steel piping and includes a pair of spaced columns 82c and 82d and upper and lower beams 82a and 82b rigidly secured at both ends to and extending between the columns 82c and 82d so as to represent a generally rectangular configuration. As best shown in FIG. 25, the bearing sleeves 81 are rigidly secured to substantially intermediate portions of the colums 82c and 82d, respectively, so as to extend at right angles thereto, and the spring casings 84a and 84b are rigidly secured to the opposite ends of the column 82c, respectively, so as to extend at right angles thereto while the spring casings 84c and 84d are rigidly secured to that of the column 82d, respectively, so as to extend at right angles thereto. It is the upper an lower beams 82a and 82b on which the upper and lower rows of the idles wheels 5a, 5c, 5e and 5b, 5d, 5f are rotatably mounted by means of brackets identified generally by 85.

Figure 27:
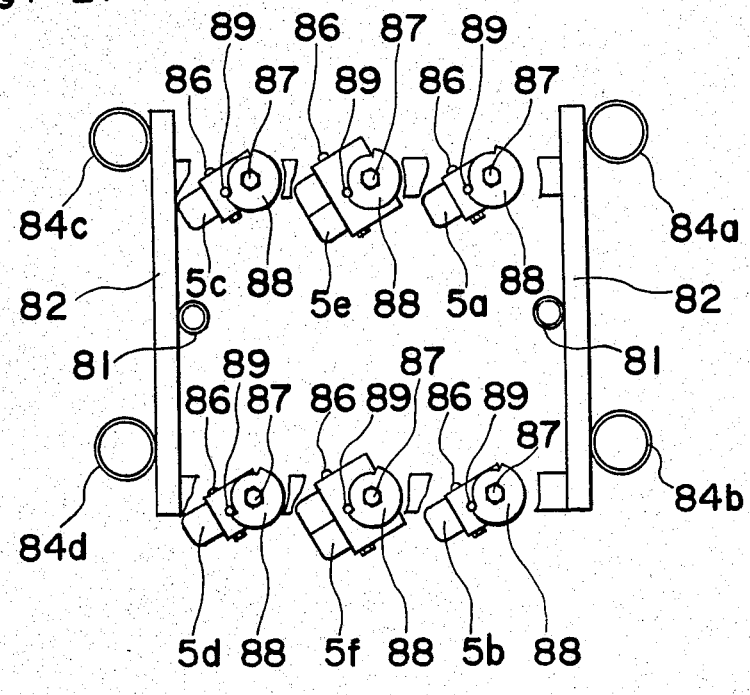
FIGS. 27 and 28 are views substantially similar to FIG. 25, showing idle wheels assuming different positions, respectively.
Figure 28:
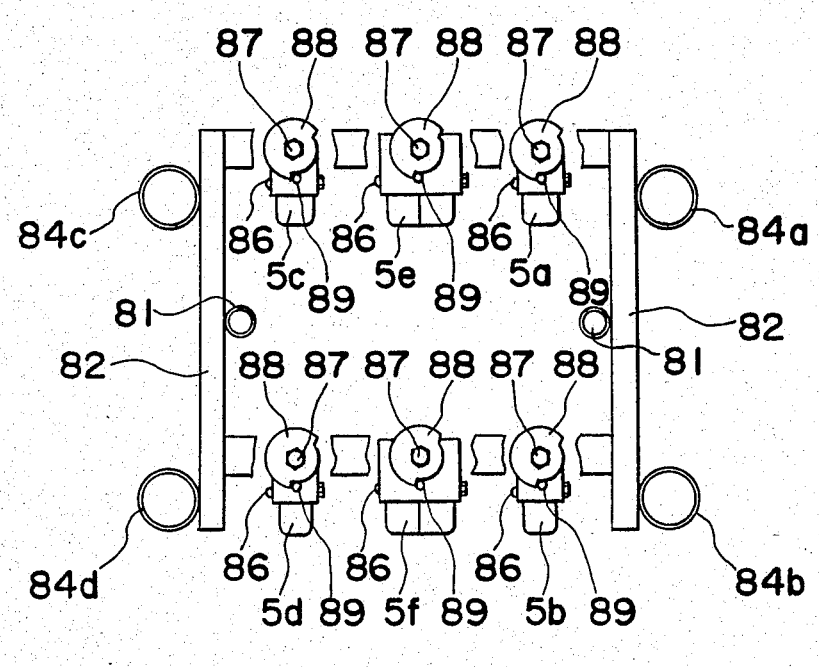

Each of the idle wheels 5a to 5f is preferably made of synthetic resin and is in the form of a caster wheel. Each idle wheel 5a, 5b, 5c, 5d, 5e or 5f is rotatably mounted by means of a respective axle member 86 on the associated bracket 85 which is in trunk mounted on the beam 82a or 82b by means of a corresponding shaft 87. The shaft 87 for each of the wheels 5a to 5f extends through the respective beam 82a or 82b for rotation about its own longitudinal axis through a limited angle and, for this purpose, as best shown in FIGS. 27 and 28, a cam plate 88, cooperable with a stop pin 89 secured to the beam 82a or 82b so as to protrude towards the associated bracket 85, is rigidly mounted on the shaft 87 for each idle wheel 5a, 5b, 5c, 5d, 5e or 5f. Specifically, the cam plate 88 and the stop pin 89 are so designed and so positioned relative to each other that, during the ascending motion of the machine X in the manner as hereinbefore described, the respective idle wheel can rotate in contact with the tree trunk about the axle member 86 in a plane inclined a certain angle to the tree trunk and generally equal to the angle of inclination of the drive wheels 2a to 2d as shown in FIG. 27, but during the descending motion of the machine X moving generally straight down the tree trunk, such idle wheel can rotate in contact with the tree trunk in a plane generally parallel to the vertical or the longitudinal axis of the tree trunk as shown in FIG. 28.

The lopping machine X of the construction described hereinabove can be set in position around the tree trunk in the following manner and operate in the following manner.

At the outset, the main body I and the auxiliary body II should be plated on respective sides of the tree trunk W having branches to be removed, in a manner with the drive wheels 2a to 2d and the idle wheels 5a to 5f facing the tree trunk W. Then, the side bars 15 should be inserted through the bearing sleeves 81 and the bearing sleeves 16a and 16b so as to extend between the main body I and the auxiliary unit II, thereby keeping the main body I and the auxiliary unit II in right position relative to the tree trunk W. Thereafter, the connecting chains 17a to 17d should be pulled one at a time against the associated springs 83a to 83d and, then, hooked to the associated hook members 18a to 18d while they are still pulled against the springs 83a to 83d, to connect the main body I and the auxiliary unit II together, thereby completing the setting of the machine X around the tree trunk W.

It is to be noted that, at the time of completion of the setting of the machine X, the idle wheels 5e and 5f located intermediately between the idle wheels 5a and 5c and between the idle wheels 5b and 5d, respectively, may not contact the tree trunk W depending on the diameter of that portion of the tree trunk at which the machine is set. In such case, the idle wheels 5e and 5f can be brought into contact with the tree trunk as the machine X ascends the tree trunk to a height where the diameter thereof becomes small. In any event, in order to avoid any possible slippage of the machine relative to the tree trunk which would be likely to occur when the machine X has ascended the tree trunk to a certain height, it is preferred that each of the intermediate idle wheels 5e and 5f has a width greater than that of any other idle wheels 5a to 5d as best shown in FIGS. 25 to 28. In addition, since there is the possibility that the machine X ascending the tree trunk may slip downward when the diameter of the tree trunk becomes smaller than the diameter of the imaginary circle defined by and enclosed by the wheels 2a to 2d and 5a to 5f, not only is the employment of the intermediate idle wheels 5e and 5f of increased width preferred, but also, the number of each row of the idle wheels on the auxiliary framework 82 of the auxiliary unit II may be increased as shown by 5g in FIG. 14.

After the setting of the machine, the engine 1 is to be started to drive both the drive wheels 2a to 2d and the chain saw 3. As the drive wheels 2a to 2d are driven, the machine X ascends the tree trunk W while revolving spirally around the tree trunk W. The angle of the helix of the path along which the machine X moves revolving around the tree trunk W corresponds to and is determined by the angle of inclination of the drive wheels 2a to 2d. At the same time, the chain saw 3 is driven with its leading run 19a travelling downwards on one side facing the direction in which the machine X is helically moved about the tree trunk W. When the chain saw 3 approaches a branch extending laterally from the tree trunk W, and if such branch is within the reach of the chain saw 3, the guide roller 46 is upwardly shifted together with the first and second pivotable levers 56 and 57 in contact with the tree branch, drawing the latter in between the roller 46 and the leading run 19a of the saw chain 19. In this way, during the continued helical revolution of the machine X, the tree branch is cut from the tree trunk W. However, if the branch is still located outside the reach of the chain saw 3 even though it contacts the guide roller 46, the guide roller 46 and, hence, the machine X as a whole, is downwardly forced into contact with the branch to let the latter pass over the guide roller 46 and, then, over the sector-shaped roller 59. This tree branch can, however, be cut from the tree trunk W during the next succeeding turn of the machine around the tree trunk W.

Figure 19:
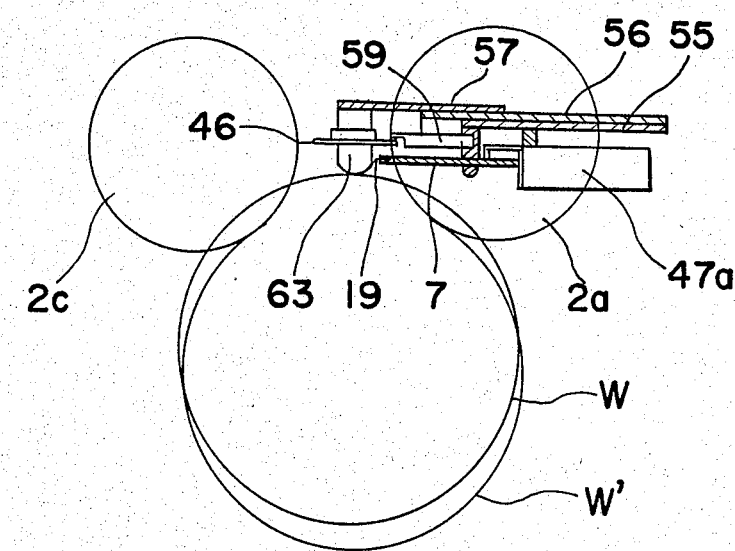
FIG. 19 is a top plan view of FIG. 18.

It is to be noted that, because of the employment of the spacer means comprised of the spaced leg members 62 and 63, the chain saw 3 is kept a predetermined distance from the peripheral surface of the tree trunk W all the way during the ascending motion of the machine. This is true even where, at a certain height, the tree trunk has a varying radius due to the presence of, for example, a lateral protuberance as shown by W' in FIG. 19. This is because the spring 52 serves to bias the guide plate 7 in one direction about the common axis of the bearing bosses 13 and 11 with the tips of the leg members 62 and 63 held constantly in sliding contact with the peripheral surface of the tree trunk W. It is also to be noted that the angle of inclination of the guide plate 7 and, hence, the chain saw 3, relative to the longitudinal axis of the tree trunk can be adjusted by adjusting the position of the fixture 51 for the upper bearing boss 13.

As the machine X ascends the tree trunk to a certain height above the ground, and with the trunk W decreasing, the springs 83a to 83d in the auxiliary unit II pull the associated connecting chains 17a to 17d in a direction inwardly of the spring casing 84a to 84d and, therefore, the main body I and the auxiliary unit II are still held in position to hold the trunk W therebetween. Upon expiration of a preset time set in a timer 35 shown in FIG. 12, with the engine 1 consequently brought to a halt, or when the engine 1 is brought to a halt by manipulating a remote-controlled switch 36, both the drive wheels 2a to 2d and the chain saw 3 are brought to a halt. At the same time, the centrifugal clutch 21 is also brought in an inoperative position and the reel 32 is, therefore, released from the main body I. When the pull cable 65 is pulled downwards after the reel 32 has dropped from the machine X, the lever 14 is pivoted to bring the retractable idle roller 4, which has been held in the retracted position, to the projected position as shown in FIG. 29 and the machine X starts descending by its own gravity generally straight down the tree trunk W. During the descending motion of the machine, the idle wheels 5a to 5f are pivoted in contact with the tree trunk to assume a vertical position at which they rotate in a plane generally parallel to the vertical. In practice, several pulls of the pull cable 65 may be required to bring the machine X completely down to the ground where the operator can remove the machine X from the tree trunk W for the next succeeding cycle of work. In such case, the machine X descends intermittently because, each time the pull cable 65 is released, the retractable idle roller 4 is retracted, allowing the drive wheels 2a to 2d to contact the tree trunk W by the action of the springs 83a to 83d. Alternatively, the pull cable 65 may be continuously pulled by using both hands alternately in quick succession to allow the machine X to descend generally continuously.

After the machine X has descended, the disengagement of the chains 17a to 17d from the hook members 18a to 18d and the subsequent removal of the side rods 15 separate the main body I and the auxiliary unit II from each other in readiness for the transportation to the next site of pruning.

Figure 30:
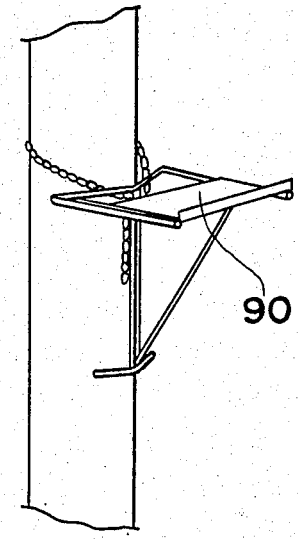
FIG. 30 is a perspective view of a table to be used to support the machine main body at the time of setting of the machine to the tree trunk.

In view of the fact that the main body I has a substantial weight while the auxiliary unit II is lightweight, the use of a support table such as shown by 90 in FIG. 30 appears desirable where the machine X is desired to be set to the tree trunk at a height corresponding to the waist-level of the operator. The support table 90 shown in FIG. 30 is, as can readily be understood by those skilled in the art, mountable removably to the tree trunk in a manner as shown for the support of the main body I thereon.

Figure 31:
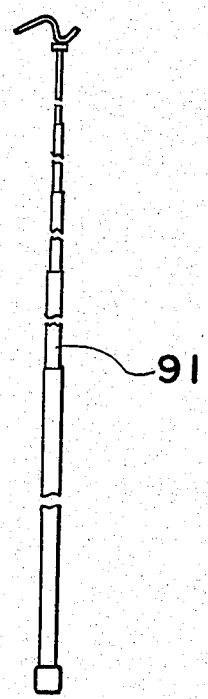
FIG. 31 is a schematic side view of a manipulating rod to be used in conjunction with the machine of this invention.

Shown in FIG. 31 is a manipulating rod 91, an accessory to the machine X, which may be used to manipulate the lever 14 exteriorly to forcibly bring the retractable idle roller 4 into the projected position and thence, to draw the machine X downwards in the event of the occurrence of any trouble in the machine X.

From the foregoing description, it has now become clear that, since the drive shaft 24 of the engine 1 is operatively coupled to both the saw chain 19 through the sprocket wheel 25 mounted thereon and the drive wheels 2a to 2d through the reduction gear unit 26 by means of the universal joints 30 and the drive chains 29a to 29d, the drive system of the machine X is simplified with the minimized number of parts used. This in turn enables the machine X to be manufactured light in weight and compact in structure. In addition, since the drive chains 29a to 29d are positioned downwardly of the associated drive wheels 2a to 2d and are covered by the covers 12 and 14, and since the trailing run 19b is covered by the covering 47, there is no possibility that some of the tree branches cut from the tree trunk may be jammed or entangled. Moreover, since each of the drive wheels 2a to 2d is in the form of a rubber-tired metal wheel as described with reference to FIGS. 15 and 16, not only are the drive wheels 2a to 2d durable, but also any possible slippage of the drive wheels 2a to 2d relative to the tree trunk can be minimized.

The feature that the chain saw 3 is adjustable in its angle of inclination by adjusting the position of the fixture 51 for the bearing boss 13 is advantageous in that the position of each tree branch where the cutting by the chain saw 3 should be effected can be adjusted. In other words, it is possible to cut a tree branch at a position spaced a certain distance from the tree trunk during one helical turn of the machine and to cut the same branch at a position close to the tree trunk during the next succeeding helical turn of the machine. In this case, upper and lower portions of the leading run 19a of the saw chain 19 are utilized at different time.

The use of the retractable idle roller is advantageous in making the machine to move downwards along the tree trunk for the recovery of the machine. Because of this, the engine need not be reversed, as is the case with the prior art, when the machine is desired to be recovered.

Figure 32:
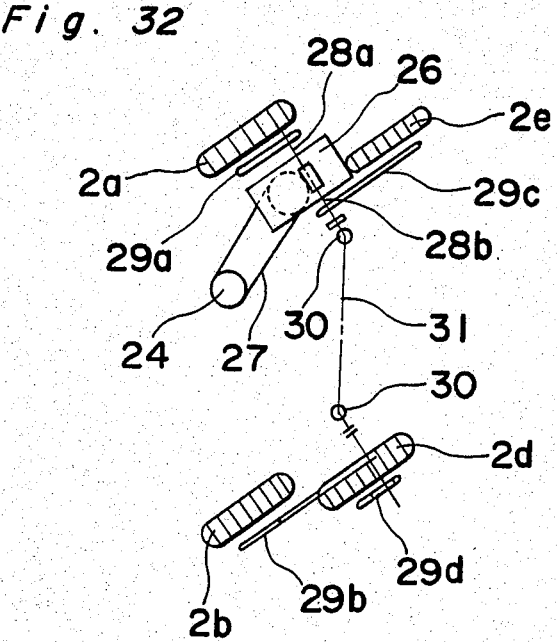
FIG. 32 is a view similar to FIG. 11, showing a modification.

Although this invention has fully been described in connection with the preferred embodiment thereof with reference to the accompanying drawings, various changes and modifications are apparent to those skilled in the art. By way of example, as shown in FIG. 32, an output shaft 28 of the reduction gear unit 26 may extend downwardly from the reduction gear unit 26 while the drive chain 29c for the drive wheel 2c located above the output shaft 28 may be drivingly coupled thereto. In addition, the auxiliary framework the auxiliary unit may be of an integral construction with the bearing sleeves and/or the spring casings.

Figure 33:
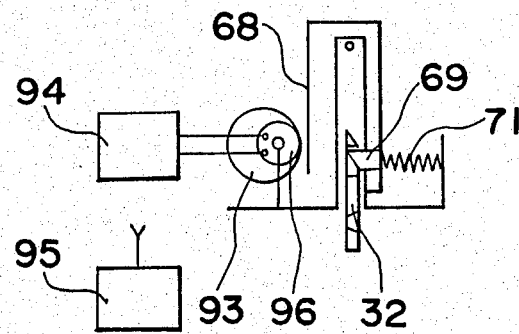
FIGS. 33 and 34 are schematic diagrams showing a remote control unit for operating the reel release mechanism, the reel release mechanism being shown in different operative positions, respectively.
Figure 34:
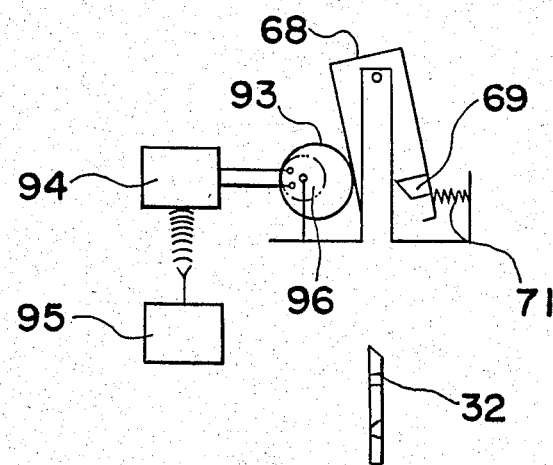

Furthermore, as shown in FIGS. 33 and 34, instead of the reel release mechanism operatively coupled to the centrifugal clutch, it may comprise a cam member 93 adapted to be driven by a motor 96 and supported so as to operate the operating plate 68. In this case, the motor 96 may be controlled by a wireless remote controller 95 capable of transmitting a command to a receiver 94 which is electrically connected to the motor 96.

Such changes and modifications are to be construed as included within the scope of this invention as defined by the appended claims, unless they depart therefrom.

What is claimed is:

1. In an automatic lopping machine which comprises a main body including a plurality of drive wheels, each adapted to be driven in a plane inclined a predetermined angle to the trunk of a standing tree having branches to be lopped, and a chain saw extending generally vertically and having a saw chain adapted to be driven in one direction for cutting the tree branches, and an auxiliary unit including a plurality of idle wheels and adapted to be connected together with the main body by means of a spring-loaded connecting means so as to encircle the tree trunk with the drive wheels and the idle wheels contacting the peripheral surface of the tree trunk, said machine during the rotation of the drive wheels revolving helically around the tree trunk so as to ascend the tree trunk while the branches are successively cut from the tree trunk by the chain saw, the improvement which comprises a single drive unit having a drive shaft, a sprocket wheel mounted on the drive shaft for rotation together therewith and drivingly coupled to the saw chain, a reduction gear unit coupled drivingly to the drive shaft and having an output shaft, and transmission means for drivingly coupling the output shaft to the drive wheels, said saw chain being driven by the drive unit at a high speed and said drive wheels being driven at a reduced speed by the drive unit through the reduction gear unit.

2. A machine as claimed in claim 1, wherein the transmission means includes connecting rods and universal joints.

* * * * *